(12) United States Patent
Aher et al.

(10) Patent No.: US 6,498,316 B1
(45) Date of Patent: Dec. 24, 2002

(54) PLASMA TORCH AND METHOD FOR UNDERWATER CUTTING

(75) Inventors: Barry Aher, Grantham; Kevin Horner-Richardson, Cornish; Roger Hewett, Plainfield, all of NH (US)

(73) Assignee: Thermal Dynamics Corporation, West Lebanon, NH (US)

( * ) Notice: Subject to any disclaimer, the term of this patent is extended or adjusted under 35 U.S.C. 154(b) by 0 days.

(21) Appl. No.: 09/693,480

(22) Filed: Oct. 20, 2000

Related U.S. Application Data
(60) Provisional application No. 60/161,398, filed on Oct. 25, 1999.

(51) Int. Cl.[7] ............................................. B23K 10/00
(52) U.S. Cl. ........................... 219/121.44; 219/121.39; 219/121.51; 219/75
(58) Field of Search .................. 219/74, 75, 121.39, 219/121.44, 121.48, 121.59, 121.51

(56) References Cited

U.S. PATENT DOCUMENTS

| | | |
|---|---|---|
| 3,832,513 A | 8/1974 | Klasson |
| 4,024,373 A | 5/1977 | Bykhovsky et al. |
| 4,029,930 A | 6/1977 | Sagara et al. |
| 4,273,982 A | 6/1981 | Stepath |
| 4,291,217 A | 9/1981 | Braun |
| 4,361,748 A | 11/1982 | Couch, Jr. |
| 4,382,170 A | 5/1983 | Klingel |
| 4,389,559 A | 6/1983 | Rotolico et al. |
| 4,390,772 A | 6/1983 | Hiratake |
| 4,421,970 A | 12/1983 | Couch, Jr. |
| 4,625,094 A | 11/1986 | Marhic et al. |
| 4,701,590 A | 10/1987 | Hatch |
| 4,716,269 A | 12/1987 | Carkhuff |
| 4,743,734 A | 5/1988 | Garlanov et al. |
| 4,816,637 A | 3/1989 | Sanders et al. |
| 4,861,962 A | 8/1989 | Sanders et al. |
| 4,902,871 A | 2/1990 | Sanders et al. |
| 5,109,150 A | 4/1992 | Rogers |
| 5,120,930 A | 6/1992 | Sanders et al. |
| 5,132,512 A | 7/1992 | Sanders et al. |
| 5,194,715 A | 3/1993 | Severance, Jr. et al. |
| 5,216,221 A | 6/1993 | Carkhuff |
| 5,278,388 A | 1/1994 | Huang |
| 5,302,804 A | 4/1994 | McGee et al. |
| 5,660,743 A | 8/1997 | Nemchinsky |
| 5,695,662 A * | 12/1997 | Couch, Jr. et al. ...... 219/121.39 |
| 6,265,689 B1 * | 7/2001 | Fusaro, Jr. ............. 219/121.47 |

FOREIGN PATENT DOCUMENTS

| | | |
|---|---|---|
| EP | 0 794 697 A2 | 9/1997 |
| FR | 2 703 557 | 10/1994 |

OTHER PUBLICATIONS
International Search Report in Application No. PCT/US 00/41499 dated Oct. 9, 2001.

* cited by examiner

Primary Examiner—Mark Paschall
(74) Attorney, Agent, or Firm—Harness, Dickey & Pierce (57) ABSTRACT

A plasma torch and method for cutting a workpiece under water directs a primary gas through a primary gas flow path in the torch to a central exit opening of the torch disposed on a longitudinal axis of the torch for exhaustion from the torch onto the workpiece in the form of an ionized plasma. The workpiece is submerged in water while the plasma torch is operated in closely spaced relationship with the workpiece to direct the ionized plasma upon the workpiece. A secondary gas flow path in the torch receives a secondary gas separate from the primary gas and directs it through the torch. Concentrically arranged first and second sets of secondary exit openings are disposed in the torch separate from the central exit opening and in generally radially spaced relationship with the longitudinal axis of the torch. The secondary exit openings exhaust secondary gas from the torch in a direction generally toward the workpiece. The secondary gas is exhausted from the first and second secondary exit openings at a flow rate sufficient to displace water surrounding the ionized plasma exiting the central exit opening of the torch to inhibit quenching of the ionized plasma.

36 Claims, 6 Drawing Sheets

PLASMA TORCH AND METHOD FOR UNDERWATER CUTTING

This application claims the benefit of provisional application 60/161,398 filed on Oct. 25, 1999.

BACKGROUND OF THE INVENTION

This invention relates to plasma cutting torches, and more specifically to a plasma cutting torch and method that provides high performance cutting of a workpiece under water.

Plasma torches, also known as electric arc torches, are commonly used for cutting and welding metal workpieces by directing a plasma consisting of ionized gas particles toward the workpiece. In a typical plasma torch such as that shown in FIG. 1, a gas to be ionized is supplied to a lower end of the torch and flows past an electrode before exiting through an orifice in the torch tip. The electrode, which is a consumable part, has a relatively negative potential and operates as a cathode. The torch tip (nozzle) surrounds the electrode at the lower end of the torch in spaced relationship with the electrode and constitutes a relatively positive potential anode. When a sufficiently high voltage is applied to the electrode, an arc is caused to jump the gap between the electrode and the torch tip, thereby heating the gas and causing it to ionize. The ionized gas in the gap is blown out of the torch and appears as an arc that extends externally off the tip. As the head or lower end of the torch is moved to a position close to the workpiece, the arc jumps 6r transfers from the torch tip to the workpiece because the impedance of the workpiece to the positive side of the power supply is lower than the impedance of the torch tip back to the power supply. During this "transferred arc" operation, the workpiece itself serves as the anode. A shield cap is typically secured on the torch body over the torch tip and electrode to complete assembly of the torch.

Figure 1:
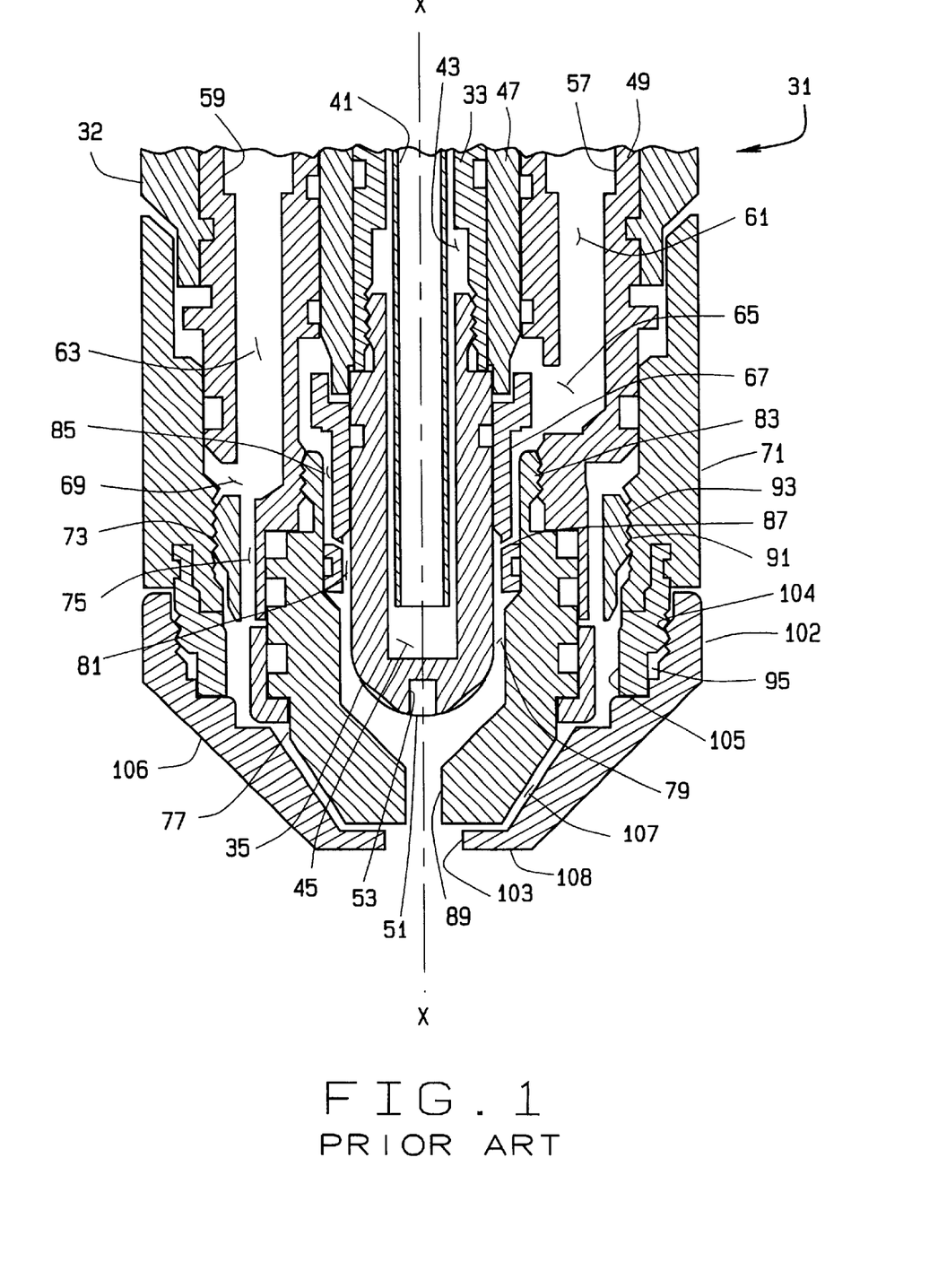
FIG. 1 is a fragmented vertical section of a torch head of a conventional plasma arc torch.

The conventional plasma torch illustrated in FIG. 1 is a dual gas torch in which a secondary gas flows through the torch concurrently with the primary working gas for purposes of cooling various parts of the torch. The secondary gas exits the torch through the shield cap, impinging on the plasma arc and the workpiece to increase the stability of the plasma arc and/or the quality of the cut made in the workpiece.

Plasma arc cutting of a workpiece is often performed with the workpiece submerged under water. This reduces glare from the plasma arc, reduces noise and smoke pollution and improves cooling of the workpiece being cut, resulting in improved dimensional stability and ease of handling. One disadvantage of cutting under water is that water tends to reduce the cutting effectiveness of the plasma arc by quenching the arc. The head of the plasma torch is placed in the water close to the workpiece. As such, heat generated by the plasma arc and used for cutting is dissipated by the water surrounding the plasma arc.

SUMMARY OF THE INVENTION

Among the several objects and features of the present invention is the provision of a plasma arc torch for cutting a workpiece under water; the provision of such a torch which improves the quality of the cut made by the torch under water; the provision of such a torch which inhibits water from quenching the plasma arc as the arc exits the torch; the provision of such a torch which forms a pocket of air surrounding the plasma arc as the arc exits the torch; and the provision of such a torch in which the secondary gas flow rate exiting the torch is optimized.

A plasma torch of the present invention for cutting a workpiece under water generally comprises a primary gas flow path in the torch for receiving a primary working gas and directing it through the torch to a central exit opening of the torch disposed on a longitudinal axis of the torch for exhaustion from the torch onto a workpiece in the form of an ionized plasma. A secondary gas flow path in the torch receives a secondary gas separate from the primary working gas and directs it through the torch. A first set of secondary exit openings in the torch separate from the central exit opening is spaced a first radial distance from the longitudinal axis of the torch. The first set of secondary exit openings is in fluid communication with the secondary gas flow path for exhausting secondary gas from the torch and is oriented for directing secondary gas exhausted from the torch through the first set of secondary exit openings generally toward the workpiece. A second set of secondary exit openings in the torch is spaced a second radial distance from the longitudinal axis of the torch greater than the first radial distance of the first set of secondary openings. The second set of secondary exit openings is in fluid communication with the secondary gas flow path for further exhausting secondary gas from the torch and is oriented for directing secondary gas exhausted from the torch through the second set of secondary exit openings generally toward the workpiece.

In another embodiment, a shield cap for use in a plasma arc torch of the type having a primary gas flow path and a secondary gas flow path comprises a hollow body having a central longitudinal axis, an upper end and a lower end having a central opening on said central longitudinal axis and in fluid communication with the primary gas flow path for exhausting primary working gas from the torch onto a workpiece in the form of an ionized plasma. An inner surface of the shield cap at least partially defines the secondary gas flow path. A first set of secondary openings separate from the central opening is spaced a first radial distance from the central longitudinal axis of the shield cap and a second set of secondary openings is spaced a second radial distance from the central longitudinal axis of the shield cap greater than the first radial distance of the first set of secondary openings. The first and second sets of secondary openings are arranged for fluid communication with the secondary gas flow path of the torch for exhausting secondary gas from the torch and are oriented such that secondary gas is exhausted from the torch via the first and second sets of secondary openings in the shield cap in a direction generally toward the workpiece.

A method of the present invention of cutting a workpiece under water using a plasma torch of the type having a gas flow path for directing working gas through the torch comprises submerging the workpiece to be cut under water and operating the plasma torch in the water in close proximity to the workpiece. The step of operating the plasma torch includes directing working gas through the gas flow path to a central exit opening of the torch disposed on a longitudinal axis of the torch for exhaustion from the torch onto the workpiece in the form of an ionized plasma. Additionally, either working gas or a secondary gas is directed toward the workpiece in generally radially spaced relationship with the longitudinal axis of the torch at a flow rate sufficient to displace water surrounding the ionized plasma exiting the central exit opening of the torch to inhibit quenching of the ionized plasma.

Other objects and features will be in part apparent and in part pointed out hereinafter.

BRIEF DESCRIPTION OF THE DRAWINGS

Corresponding reference characters indicate corresponding parts throughout the several views of the drawings.

DETAILED DESCRIPTION OF THE PREFERRED EMBODIMENTS

Figure 2:
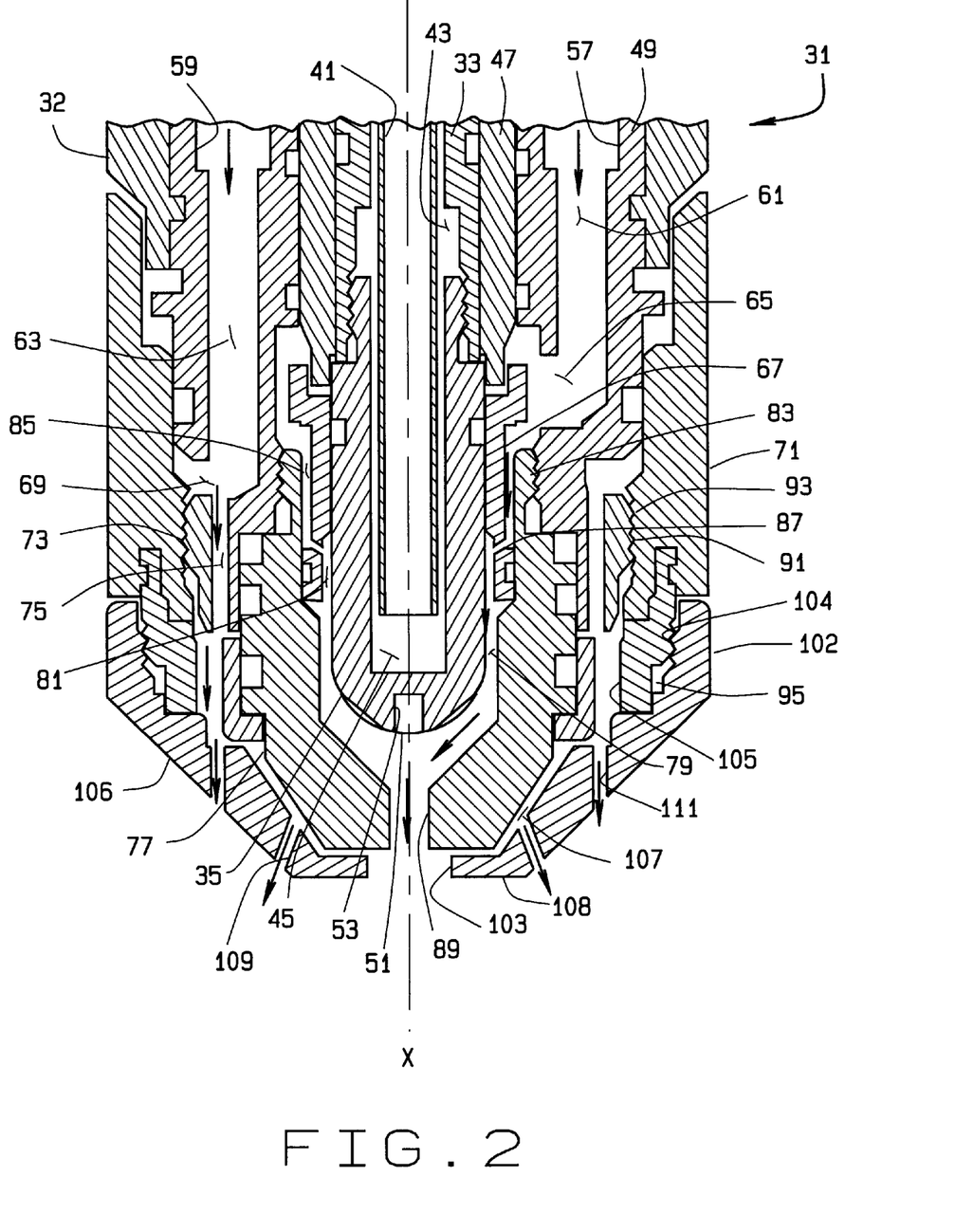
FIG. 2 is a fragmented vertical section of a torch head of a plasma arc torch of the present invention.

With reference to FIG. 2, a torch head of a plasma arc torch of the present invention for cutting a workpiece under water is generally indicated at 31. The torch is a dual gas type torch in which both a primary working gas and a secondary gas or fluid are utilized. The torch head 31 includes a cathode 33 having an upper end (not shown) secured in a torch body 32 (a portion of which is shown in FIG. 2) of the torch, and an electrode 35 electrically connected to the cathode. The cathode 33 and electrode 35 are arranged in coaxial relationship with each other about a longitudinal axis X of the torch. The electrode 33 of the illustrated embodiment is constructed of copper, and has an insert 51 of emissive material (e.g., hafnium) secured in a recess 53 in the bottom of the electrode. A central insulator 47 (a portion of which is shown in the drawing) constructed of a suitable electrically insulating material surrounds a substantial portion of the cathode 33 to electrically isolate the cathode from a generally tubular anode 49 that surrounds the insulator. A cooling tube 41 extends longitudinally within a central bore 43 of the cathode 33 down into a central bore 45 of the electrode 35. The cooling tube 41 is in fluid communication with a source (not shown) of cooling water to receive cooling water into the tube and direct the water down into the electrode bore 45. The cooling water flows out from the cooling tube 41 generally at the bottom of the tube to cool the electrode 35, particularly in the area of the emissive insert 51. The water then flows upward within the electrode bore 45 and cathode bore 43 and outward therefrom for cooling other components of the torch prior to being exhausted from the torch.

The anode 49 has a pair of intake ports 57, 59 for separately receiving a primary working gas and a secondary gas. More particularly, the primary gas intake port 57 is in fluid communication with a source (not shown) of working gas for receiving the primary working gas into the torch head 3 1, and the secondary gas intake port 59 is in fluid communication with a source (not shown) of secondary gas for receiving secondary gas into the torch head. As an example, the primary gas is pure oxygen and the secondary gas is compressed air, free of oil impurities. Primary and secondary channels, indicated as 61 and 63, respectively, extend down through the anode 49 from the corresponding intake ports 57, 59 to direct the primary working gas and secondary gas down through the anode. The first channel 61 leads to an annular inner plenum 65 formed between the anode 49 and the outer surfaces of the central insulator 47 and a gas distributor 67. The second channel 63 leads to an annular outer plenum 69 which is separate from the inner plenum 65 and defined by the anode 49 and the inner surface of a shield body 71 surrounding the anode. A lower end 73 of the anode 49 includes longitudinally extending bores 75 in fluid communication with the outer plenum 69 to direct secondary gas out from the lower end of the anode.

A metal tip 77, also commonly referred to as a nozzle, is disposed in the torch head 31 surrounding a lower portion of the electrode 35 in radially and longitudinally spaced relationship therewith to form a primary gas passage 79 (otherwise referred to as an arc chamber or plasma chamber) between the tip and the electrode. An inlet passage 81 defined by the electrode 35 and a lower portion of the generally tubular gas distributor 67 extends longitudinally within the torch head 31 in radially spaced relationship with the electrode. The inlet passage 81 is in fluid communication with the primary gas passage 79 for directing primary gas into the primary gas passage. An upper end 83 of the tip 77 extends up between the anode 49 and the gas distributor 67 for threaded connection with the anode in radially spaced relationship with the gas distributor to define a passage 85 in fluid communication with the inner plenum 65 and extending down from the inner plenum to the lower portion of the gas distributor. Openings 87 in the lower portion of the gas distributor 67 are in fluid communication with the passage 85 extending down from the inner plenum 65 of the anode 49 to direct primary working gas in the inner plenum to flow into the inlet passage 81 and then down through the primary gas passage 79. The openings 87 in the gas distributor 67 are formed generally tangentially thereto for causing a swirling action of the primary gas flowing into and down through the primary gas passage 79. A portion of the primary gas passage 79 generally along the bottom of the insert 51 defines an arc region in which a plasma arc attaches to the electrode during operation of the torch. A central exit orifice 89 of the tip 77 is in fluid communication with the primary gas passage 79 such that primary gas exits the tip in the form of an ionized plasma, or plasma arc, and is directed down against the workpiece.

Still referring to FIG. 2, the shield body 71 surrounding the anode 49 is constructed of a heat insulating material and has internal threads 91 for threaded engagement with corresponding external threads 93 on the anode to secure the shield body on the anode. An insert 95 constructed of a heat insulating material is secured to the shield body 71. The insert 95 of the illustrated embodiment is integrally formed with the shield body 71. However, it is contemplated that the insert 95 may be formed separately from the shield body 71 and connected thereto, as by threaded connection, without departing from the scope of this invention. A shield cap 101 of the present invention surrounds the torch tip 77 in longitudinally and radially spaced relationship therewith and is threadably connected to the insert 95 to secure the shield cap on the torch head 31. The shield cap 101 shown in FIG. 2 has a cylindrical upper wall 102 at the upper end of the shield cap having internal threads 104 for threaded connection with the insert 95, a generally conical side wall 106 extending downward and inward from the upper wall toward the longitudinal axis X of the torch, and a front face or wall 108 at the bottom of the shield cap extending generally at a right angle to the longitudinal axis of the torch. It is understood, however, that the side wall 106 of the shield cap 101 may instead be cylindrical, and may further be of the same outer diameter as the upper wall 102 so that the side wall and upper wall are in flush alignment, without departing from the scope of this invention. A central opening 103 in the shield cap 101 is coaxially aligned with the central exit orifice 89 of the tip 77 on the longitudinal axis X of the torch to define a central exit opening of the torch through which the plasma arc exits the torch and is directed onto the workpiece.

Longitudinally extending bores 105 in the insert 95 are in fluid communication with the bores 75 in the lower end 73 of the anode 49 so that secondary gas flowing through the anode is further directed down through the bores in the shield cap insert into a secondary gas passage 107 formed between the inner surface of the shield cap 101 and the tip 77 as well as between the shield cap and a portion of the insert. As shown in FIG. 2, the secondary gas passage 107 extends from the bores 105 of the insert 95 to the central opening 103 of the shield cap 101 for exhausting secondary gas from the torch head 31 and directing the secondary gas to impinge on the plasma arc as the arc and secondary gas exit the torch head through the central opening.

Figure 3:
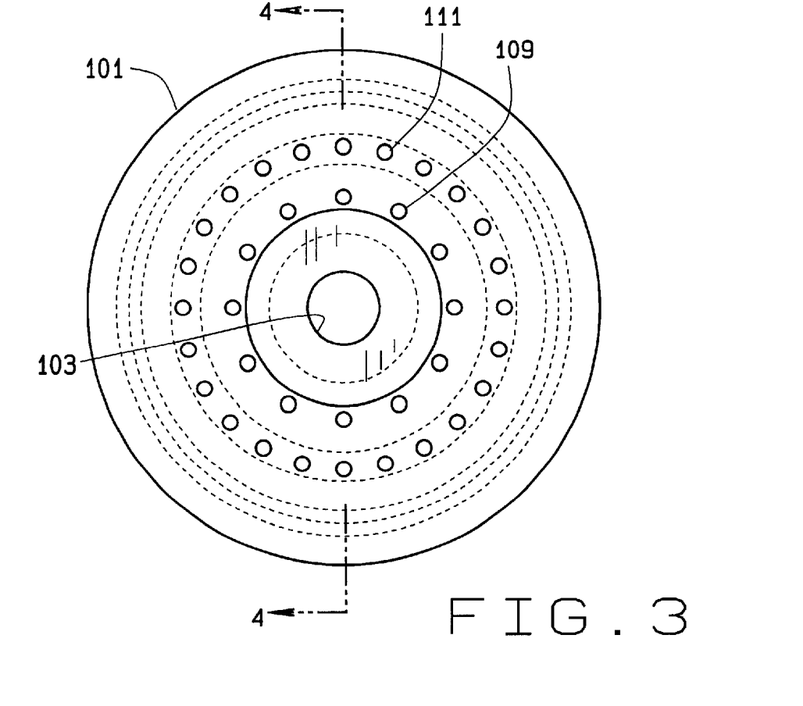
FIG. 3 is a bottom view of a shield cap of the torch head of FIG. 2.
Figure 4:
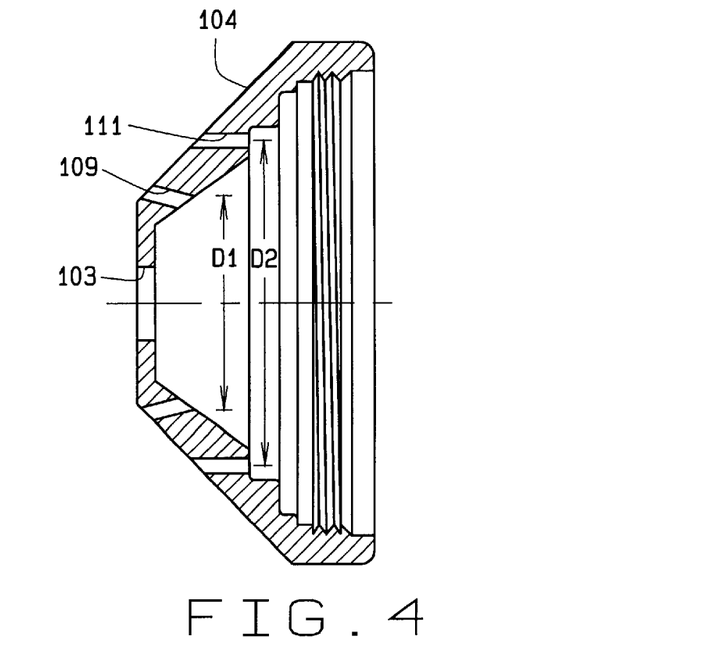
FIG. 4 is a section taken in the plane of line 4—4 of FIG. 3.

Referring to FIGS. 3 and 4, a first set of secondary openings 109 are provided in the side wall 108 of the shield cap 101, with each such opening having a central axis extending generally at an angle relative to the longitudinal axis X of the torch. The openings 109 are positioned in generally radially spaced relationship with the longitudinal axis X of the torch a distance D1 (FIG. 4) to define a first set of secondary exit openings of the torch. The openings 109 are spaced equidistant from each other about the longitudinal axis X and the central opening 103, forming a concentric inner ring of openings about the central opening of the shield cap 101. These secondary openings 109 are in fluid communication with the secondary gas passage 107 upstream of the central opening 103 of the shield cap 101 to exhaust a portion of secondary gas from the torch head 31 as the gas flows through the secondary gas passage toward the central opening of the shield cap.

As an example, the centers of the openings 109 of the illustrated embodiment are spaced radially a distance D1 of 0.328 inches from the longitudinal axis X of the torch. It is understood this distance may vary. However, the distance is preferably at least about 0.265 inches, more preferably within a range of about 0.265 inches to about 0.328 inches and most preferably about 0.328 inches to space the openings 109 from the longitudinal axis X a distance sufficient to reduce the risk that secondary gas exiting the openings will destabilize the plasma arc exiting the central opening 103 of the shield cap 101. The orientation of the secondary openings 109 directs secondary gas exhausted from the torch generally toward the workpiece in spaced relationship with the plasma arc and the longitudinal axis X of the torch. The central axis of each of the secondary openings 109 is angled outward relative to the longitudinal axis X of the torch at an angle in the range of about 0°–15°, and is more preferably about 15°. The openings 109 may alternatively be disposed in the front wall 108 of the shield cap 101 and remain within the scope of this invention.

A second set of secondary openings 111 is provided in the conical side wall 106 of the shield cap 101, with each such opening having a central axis extending generally parallel to the longitudinal axis X of the torch. The openings 111 are spaced generally radially from the longitudinal axis X a distance D2 (FIG. 4) greater than the distance D1 of the first set of secondary openings 109 from the longitudinal axis to define a second set of secondary exit openings of the torch. The openings 111 may alternatively be disposed in the front wall 108 of the shield cap 101 and remain within the scope of this invention. This second set of openings 111 is also in fluid communication with the secondary gas passage 107 to further exhaust an additional portion of secondary gas from the torch toward the workpiece as the secondary gas flows through the secondary gas passage to the central opening 103 of the shield cap 101. As shown in FIG. 3, these secondary openings 111 are spaced equidistant from each other about the central opening 103, forming a second concentric outer ring of openings about the central opening of the shield cap 101. For example, the centers of the openings 111 are spaced a distance D2 from the longitudinal axis a distance of at least about 0.375 inches, more preferably in the range of about 0.375 inches to about 0.5 inches, and most preferably about 0.481 inches.

The relative number and size of the secondary openings 109, 111 in the front wall 108 of the shield cap 101 are a function of the desired flow rate of secondary gas exhausted from the torch through the openings relative to a desired flow rate of the remaining secondary gas to be exhausted from torch through the central opening 103 of the shield cap. In the preferred embodiment for cutting a workpiece under water, the flow rate of secondary gas exhausted from the torch through the first and second sets of secondary openings 109, 111 of the shield cap 101 is substantially greater than the flow rate of secondary gas exhausted from the torch through the central opening 103. For example, the ratio defined by the flow rate of secondary gas exhausted from the secondary openings 109, 111 relative to the flow rate of secondary gas exhausted from the central opening 103 of the shield cap 101 is preferably at least 5:1, and more preferably is in the range of about 15:1 to 20:1.

In the illustrated embodiment, the first set of secondary openings 109 includes twelve such openings, each having a diameter of about 0.047 inches. The second set of secondary openings 111 includes twenty-four such openings, with each opening also having a diameter of about 0.047 inches. The diameter of the central opening 103 of the shield cap 101 is approximately 0.219 inches. For plasma cutting under water using the illustrated torch at 100–300 amps with oxygen used as the primary working gas and air used as the secondary gas, an optimal secondary gas flow rate through the first and second sets of secondary openings 109, 111 is in the range of about 150 scfh (standard cubic feet per hour) to about 400 scfh, and is more preferably about 285 scfh, with a flow rate of secondary gas through the central opening 103 of the shield cap 101 being in the range of about 10 scfh to about 20 scfh, and more preferably about 15 scfh.

Figure 5:
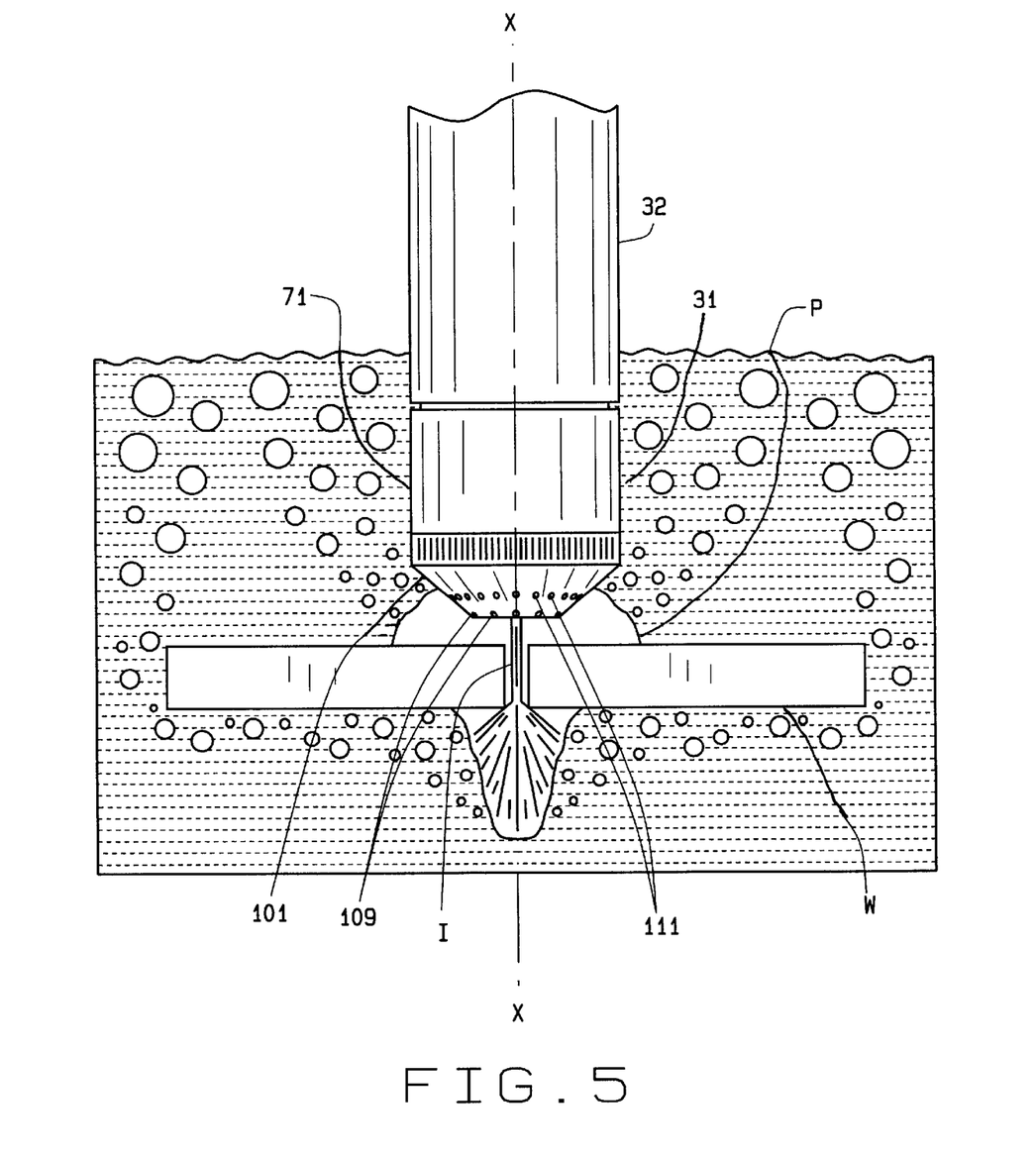
FIG. 5 is a schematic of a plasma arc torch of the present invention cutting a workpiece under water according to a method of the present invention.

With reference to FIG. 5, in operation according to a method of the present invention for cutting a workpiece under water, a workpiece W is submerged under water and the torch is oriented generally downward with the torch head 31 also under water in close proximity to the workpiece. Primary working gas, such as pure oxygen, is pumped from the source of working gas into the torch and flows through a primary gas flow path (indicated by single shaft arrows in FIG. 2) comprising the anode primary intake port 57, anode channel 61, inner plenum 65, passage 85, gas distributor openings 87, inlet passage 81, primary gas passage 79, tip orifice 89, and the central opening 103 of the shield cap 101. Primary gas in the primary gas passage 79 flows down through the arc region and out through the exit orifice 89 of the tip 77 and central opening 103 of the shield cap 101 in the form of an ionized plasma I.

Secondary gas, such as compressed air, is concurrently received from the source of secondary gas into the torch and flows through a secondary gas flow path (indicated by double shaft arrows in FIG. 2) comprising the secondary gas intake port 59, anode channel 63, outer plenum 69, the longitudinally extending bores 75 in the lower end 73 of the anode, the bores 105 in the insert 95, the secondary gas passage 107, the first and second sets of secondary openings 109, 111 in the shield cap 101 and the central opening 103 of the shield cap. As secondary gas flows down through the secondary gas passage 107, a substantial portion of the secondary gas is exhausted from the torch via the first and second sets of secondary openings 109, 111 in the shield cap 111. The orientation of the openings 109, 111 directs the secondary gas down generally toward the workpiece W. Secondary gas exits the torch at a sufficiently high flow rate to displace water surrounding the plasma arc. An air pocket P is thus formed beneath the shield cap 101 surrounding the central opening 103 of the shield cap to shield the plasma flow I exiting the central opening of the shield cap against contact by the water. The remaining portion of secondary gas flows through the secondary gas passage 107 toward the central opening 103 of the shield cap 101, communicating with the primary gas flow path to impinge upon the plasma arc as the ionized plasma exits the torch through the central opening of the shield cap.

While the plasma torch and method of the present invention are shown and described above as directing secondary gas through a secondary gas flow path in the torch for exhaustion through secondary openings 109, 111 in the shield cap, it is contemplated that gas, such as either the primary working gas or the secondary gas, may be directed generally toward the workpiece W from external of the torch, such as by a collar (not shown) circumscribing the torch head 31 in fluid communication with the source of working gas or the source of secondary gas and having openings for directing the gas generally toward the workpiece W in radially spaced relationship with the central axis of the torch, without departing from the scope of this invention.

Figure 6:
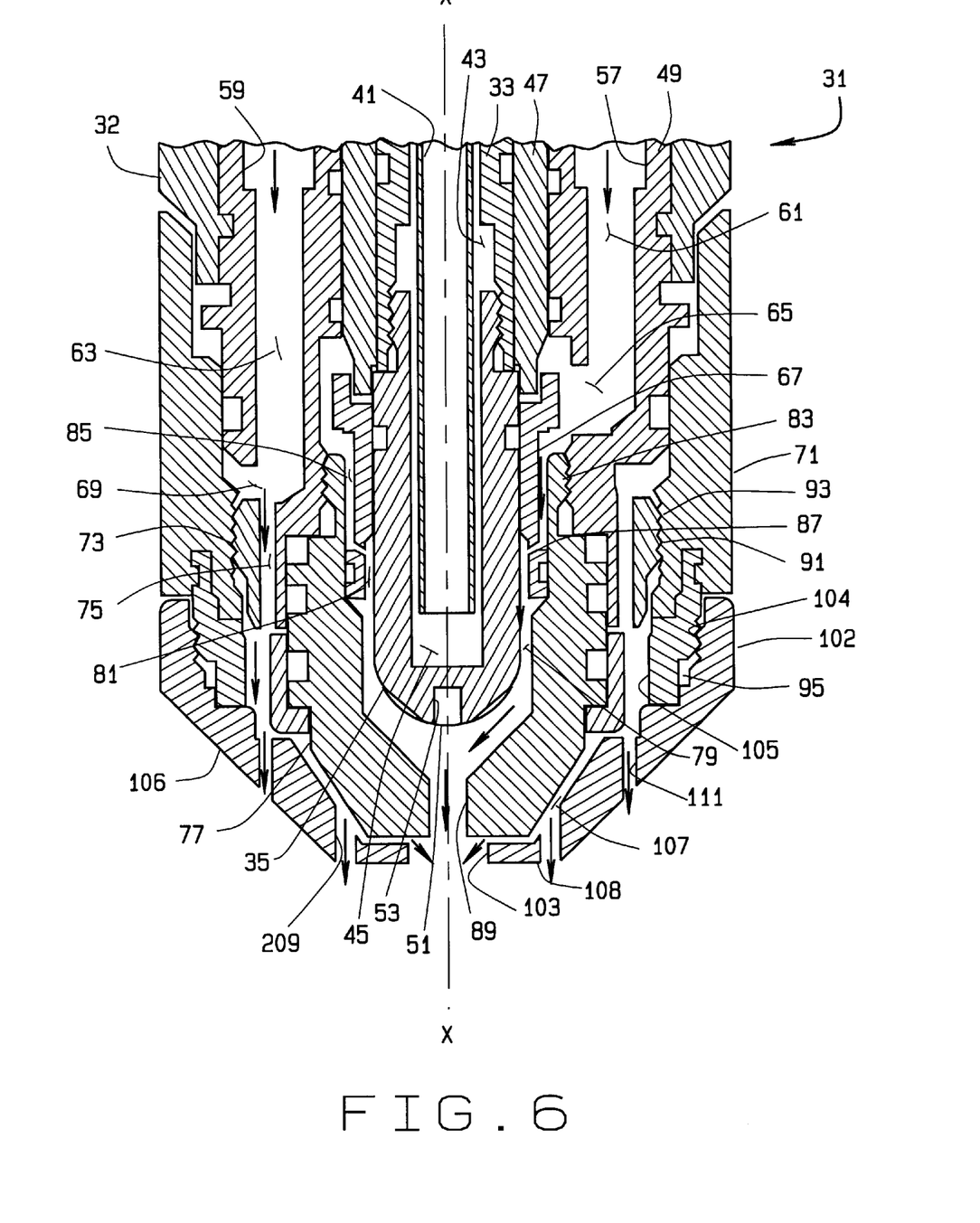
FIG. 6 is a fragmented vertical section of a torch head of a second embodiment of a plasma arc torch of the present invention.
Figure 7:
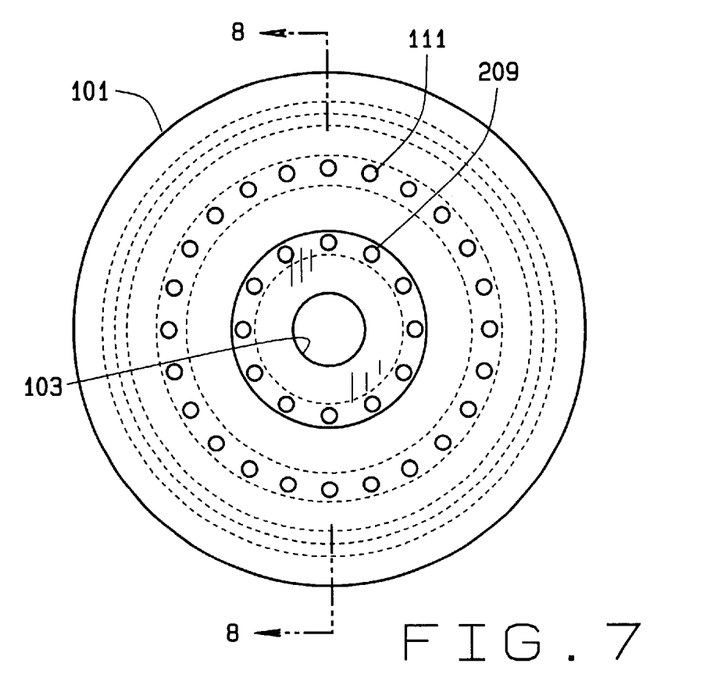
FIG. 7 is a bottom view of a shield cap of the torch head of FIG. 6.
Figure 8:
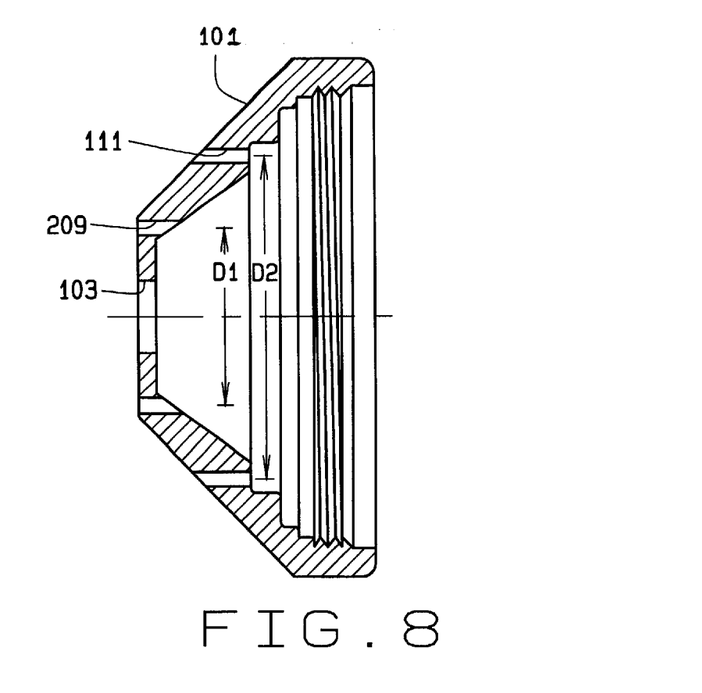
FIG. 8 is a section taken in the plane of line 8—8 of FIG. 7.

FIGS. 6–8 illustrate a second embodiment of a plasma torch of the present invention similar to the first embodiment of FIGS. 2–4 but with a first set of secondary openings 209 provided in the front wall 108 of the shield cap 101. Each of the openings 209 has a central axis extending generally parallel to the longitudinal axis X of the torch. The openings 209 are positioned in generally radially spaced relationship with the longitudinal axis X of the torch a distance D1 (FIG. 8) to define the first set of secondary exit openings of the torch. The openings 209 are spaced equidistant from each other about the longitudinal axis X and the central opening 103, forming a concentric inner ring of openings about the central opening of the shield cap 101. These secondary openings 209 are in fluid communication with the secondary gas passage 107 upstream of the central opening 103 of the shield cap 101 to exhaust a portion of secondary gas from the torch head 31 as the gas flows through the secondary gas passage toward the central opening of the shield cap.

As an example, the centers of the openings 209 of the illustrated embodiment are spaced radially a distance D1 of 0.256 inches from the longitudinal axis X of the torch. It is understood this distance may vary. However, as discussed with respect to the openings 109 of the first embodiment, the distance D1 is preferably at least about 0.265 inches and more preferably within a range of about 0.265 inches to about 0.328 inches to space the openings 209 from the longitudinal axis X a distance sufficient to reduce the risk that secondary gas exiting the openings will destabilize the plasma arc exiting the central opening 103 of the shield cap 101. The longitudinal orientation of the secondary openings 209 directs secondary gas exhausted from the torch toward the workpiece in a direction generally parallel to the plasma arc and the longitudinal axis X of the torch. The openings 209 may alternatively be disposed in the side wall 106 of the shield cap 101 and remain within the scope of this invention.

In view of the above, it will be seen that the several objects of the invention are achieved and other advantageous results attained. Providing two sets of secondary openings 109, 111 in the shield cap 101 spaced radially from the longitudinal axis X and the central opening 103 permits a greater volume of secondary gas to exit the torch before the gas flows to the central opening 103 of the shield cap. Thus, the flow rate of secondary gas exiting the torch through the secondary openings 109, 111 and directed toward the workpiece W can be substantially greater than the flow rate of secondary gas flowing to the central opening 103 such that the secondary gas impinging on the plasma arc I is sufficiently low enough to reduce the risk of destabilizing the arc. The high flow rate of secondary gas exhausted through the secondary openings 109, 111 displaces water beneath the shield cap 101, creating an air pocket P beneath the shield cap and surrounding the plasma arc I to reduce the quenching effect of water on the cutting arc. Since the workpiece W remains in the water, the advantages of cutting under water, such as reduced noise, glare and smoke, are still achieved.

Moreover, directing the secondary gas flow from two sets of secondary openings 109, 111 in a direction generally toward the work piece, with the second set of secondary openings spaced radially outward from the longitudinal axis X a distance greater than the radial spacing of the first set of secondary openings, allows secondary gas to exit the secondary openings close enough to the central opening 103 of the shield cap 101 to form an air pocket P surrounding the arc, but far enough away so as to reduce the risk of destabilizing the plasma arc.

When introducing elements of the present invention or the preferred embodiment(s) thereof, the articles "a", "an", "the" and "said" are intended to mean that there are one or more of the elements. The terms "comprising", "including" and "having" are intended to be inclusive and mean that there may be additional elements other than the listed elements.

As various changes could be made in the above constructions without departing from the scope of the invention, it is intended that all matter contained in the above description or shown in the accompanying drawings shall be interpreted as illustrative and not in a limiting sense.

What is claimed is:

1. A plasma torch comprising:

a primary gas flow path in the torch for receiving a primary working gas and directing it through the torch to a central exit opening of the torch disposed on a longitudinal axis of the torch for exhaustion from the torch onto a workpiece in the form of an ionized plasma;

a secondary gas flow path in the torch for receiving a secondary gas separate from the primary working gas and directing it through the torch;

a first set of secondary exit openings in the torch separate from the central exit opening and spaced a first radial distance from the longitudinal axis of the torch, said first set of secondary exit openings being in fluid communication with the secondary flow path for exhausting secondary gas from the torch, the first set of secondary exit openings further being oriented for directing secondary gas exhausted from the torch through the first set of secondary exit openings generally toward the workpiece; and a second set of secondary exit openings in the torch spaced a second radial distance from the longitudinal axis of the torch greater than the first radial distance of the first set of secondary openings, said second set of secondary exit openings being in fluid communication with the secondary gas flow path for further exhausting secondary gas from the torch, the second set of secondary exit openings further being oriented for directing secondary gas exhausted from the torch through the second set of secondary exit openings generally toward the workpiece.

2. A plasma torch as set forth in claim 1 wherein the secondary gas flow path is in fluid communication with the primary gas flow path generally adjacent the central exit opening of the torch, the first and second sets of secondary exit openings being in fluid communication with the secondary gas flow path upstream of the central exit opening such that a portion of secondary gas is exhausted from the torch via the first and second sets of secondary exit openings and the remaining portion of secondary gas is exhausted from the torch via the central exit opening to impinge upon the ionized plasma as the ionized plasma exits the torch through the central exit opening.

3. A plasma torch as set forth in claim 2 wherein the first and second sets of secondary exit openings are sized and numbered such that secondary gas is exhausted from the torch through the first and second sets of secondary exit openings at a flow rate substantially greater than the flow rate at which secondary gas is exhausted from the central exit opening of the torch.

4. A plasma torch as set forth in claim 3 wherein the first and second sets of secondary exit openings are sized and numbered such that the ratio of the flow rate of secondary gas exhausted from the torch through the first and second sets of secondary exit openings relative to the flow rate of secondary gas exhausted through the central exit opening of the torch is at least 5:1.

5. A plasma torch as set forth in claim 4 wherein said ratio is in the range of about 15:1 to 20:1.

6. A plasma torch as set forth in claim 1 wherein the second set of secondary exit openings is oriented for directing secondary gas exhausted from the torch through said second set of secondary exit openings in a direction generally parallel to the longitudinal axis of the torch.

7. A plasma torch as set forth in claim 6 wherein the first set of secondary exit openings is oriented for directing secondary gas exhausted from the torch through said first set of secondary exit openings in a direction generally parallel to the longitudinal axis of the torch.

8. A plasma torch as set forth in claim 1 wherein the first set of secondary exit openings is oriented for directing secondary gas exhausted from the torch through said first set of secondary exit openings at an angle generally outward relative to the longitudinal axis of the torch.

9. A plasma torch as set forth in claim 8 wherein said angle is in the range of about 0° to about 15°.

10. A plasma arc torch as set forth in claim 1 further comprising:
   a cathode;
   an electrode electrically connected to the cathode;
   a tip surrounding the electrode in spaced relationship therewith to define a primary gas passage forming at least part of the primary gas flow path, the tip having a central exit orifice in fluid communication with the gas passage;
   a shield cap surrounding the tip and having a central opening in coaxial alignment with the central exit orifice of the tip to define the central exit opening of the torch through which primary gas is directed onto the workpiece in the form of an ionized plasma, the shield cap being in radially and longitudinally spaced relationship with the tip to define a secondary gas passage forming at least a part of the secondary gas flow path, the shield cap further having a first set of secondary openings spaced radially from the longitudinal axis of the torch to define said first set of secondary exit openings of the torch and a second set of secondary openings spaced radially from the longitudinal axis of the torch a distance substantially greater than the first set of openings to define the second set of secondary exit openings of the torch.

11. A plasma torch as set forth in claim 10 wherein the second set of secondary openings extends longitudinally within the shield cap in generally parallel relationship with the longitudinal axis of the torch.

12. A plasma torch as set forth in claim 11 wherein the first set of secondary openings extends longitudinally within the shield cap in generally parallel relationship with the longitudinal axis of the torch.

13. A plasma torch as set forth in claim 10 wherein the first set of secondary exit openings extends generally outward within the shield cap at an angle relative to the longitudinal axis of the torch.

14. A plasma torch as set forth in claim 13 wherein said angle is in the range of about 0° to about 15°.

15. A shield cap for use in a plasma arc torch of the type having a primary gas flow path for directing a primary working gas through the torch and a secondary gas flow path for directing a secondary gas through the torch, the shield cap comprising a hollow body having a central longitudinal axis, an upper end, a lower end having a central opening on said central longitudinal axis and in fluid communication with the primary gas flow path for exhausting primary working gas from the torch onto a workpiece in the form of an ionized plasma, an inner surface at least partially defining the secondary gas flow path, a first set of secondary openings separate from the central opening and spaced a first radial distance from the central longitudinal axis of the shield cap and a second set of secondary openings spaced a second radial distance from the central longitudinal axis of the shield cap greater than the first radial distance of said first set of secondary openings, the first and second sets of secondary openings being arranged for fluid communication with the secondary gas flow path of the torch for exhausting secondary gas from the torch and being oriented such that secondary gas is exhausted from the torch via the first and second sets of secondary openings in the shield cap in a direction generally toward the workpiece.

16. A shield cap as set forth in claim 15 wherein the first and second sets of secondary openings in the shield cap lie on concentric circles about the central longitudinal axis and central opening of the shield cap.

17. A shield cap as set forth in claim 16 wherein the first set of secondary openings are spaced radially from the central longitudinal axis of the shield cap a distance of at least about 0.265 inches.

18. A shield cap as set forth in claim 17 wherein said distance is in the range of about 0.265 inches to about 0.328 inches.

19. A shield cap as set forth in claim 15 wherein the second set of secondary openings extends longitudinally within the shield cap in generally parallel relationship with the central longitudinal axis of the shield cap.

20. A shield cap as set forth in claim 19 wherein the first set of secondary openings extends longitudinally within the shield cap in generally parallel relationship with the central longitudinal axis of the shield cap.

21. A plasma torch as set forth in claim 15 wherein the first set of secondary exit openings extends generally outward within the shield cap at an angle relative to the longitudinal axis of the torch.

22. A plasma torch as set forth in claim 21 wherein said angle is in the range of about 0° to about 15°.

23. A shield cap as set forth in claim 15 wherein the central opening of the shield cap is arranged for fluid communication with the secondary gas flow path for exhausting a portion of the secondary gas from the torch via the central opening, the first and second sets of secondary openings being numbered and sized for exhausting secondary gas from the torch at a flow rate at least five times greater than the flow rate at which secondary gas is exhausted from the torch through the central opening of the shield cap.

24. A shield cap as set forth in claim 23 wherein the number and size of the openings of the first and second sets of secondary openings is sufficient to exhaust secondary gas from the torch through the first and second sets of secondary openings at a flow rate of about 15–20 times greater than the flow rate at which secondary gas is exhausted from the torch through the central opening of the shield cap.

25. A method of cutting a workpiece under water using a plasma torch of the type having a gas flow path for directing working gas through the torch, the method comprising the steps of:
    operating the plasma torch under water in close proximity to the workpiece;
    the step of operating the plasma torch including the steps of directing working gas along the gas flow path to a central exit opening of the torch disposed on a longitudinal axis of the torch for exhaustion from the torch onto the workpiece in the form of ionized plasma, and directing at least one of said working gas and a secondary gas through the torch to a secondary exit opening of the torch spaced radially from the central exit opening of the torch, and exhausting said at least one of said working gas and said secondary gas from the torch through said secondary exit opening in a direction generally toward the workpiece at a flow rate sufficient to displace water surrounding the ionized plasma exiting the central exit opening of the torch to inhibit quenching of the ionized plasma.

26. The method of claim 25 wherein the plasma torch is of the type having a secondary gas flow path for directing a secondary gas through the torch, the step of directing at least one of said working gas and a secondary gas toward the workpiece comprising directing secondary gas along the secondary gas flow path to a set of secondary exit openings of the torch disposed in generally radially spaced relationship with the longitudinal axis of the torch for exhaustion from the torch through said secondary exit openings generally toward the workpiece, the flow rate of secondary gas from the secondary exit openings being sufficient to displace water surrounding the ionized plasma exiting the central exit opening of the torch to inhibit quenching of the ionized plasma.

27. The method of claim 26 wherein the set of secondary exit openings is a first set of secondary exit openings, the method further comprising the step of directing secondary gas through the secondary gas flow path to a second set of secondary exit openings of the torch for exhausting secondary gas from the torch, the second set of secondary exit openings being in generally radially spaced relationship with the longitudinal axis of the torch at a distance substantially greater than the distance of the first set of secondary exit openings from the longitudinal axis, the flow rate of secondary gas from the second set of secondary exit openings being sufficient to further displace water surrounding the ionized plasma exiting the central exit opening of the torch to further inhibit quenching of the ionized plasma.

28. The method of claim 27 wherein the step of directing secondary gas to the second set of secondary exit openings of the torch for exhaustion from the torch comprises exhausting the secondary gas from the torch via the second set of secondary exit openings in an orientation generally parallel to the flow of ionized plasma from the central exit opening.

29. The method of claim 28 wherein the step of directing secondary gas to the first set of secondary exit openings of the torch for exhaustion from the torch comprises exhausting the secondary gas from the torch via the first set of secondary exit openings in an orientation generally parallel to the flow of ionized plasma from the central exit opening.

30. The method of claim 27 wherein the step of directing secondary gas to the first set of secondary exit openings of the torch for exhaustion from the torch comprises exhausting secondary gas from the torch via the first set of secondary exit openings in a orientation angled generally outward relative to the longitudinal axis of the torch.

31. The method of claim 30 wherein said angle is in the range of about 0° to about 15°.

32. The method of claim 26 further comprising the step of directing a portion of the secondary gas in the secondary gas flow path to the central exit opening for exhaustion from the torch, the step of directing secondary gas to the secondary exit openings comprising directing the secondary gas to the secondary exit openings for exhaustion from the torch at a flow rate at least five times greater than the flow rate at which secondary gas is exhausted from the torch through the central exit opening.

33. The method of claim 32 wherein the step of directing secondary gas to the secondary exit openings comprises directing the secondary gas to the secondary exit openings for exhaustion from the torch at a flow rate of about 15–20 times greater than the flow rate at which secondary gas is exhausted from the torch through the central exit opening.

34. The method of claim 32 wherein the secondary gas is directed to flow through the secondary exit openings upstream of the central exit opening of the torch.

35. A plasma torch for cutting a workpiece under water, said plasma torch comprising:
    a primary gas flow path in the torch for receiving a primary working gas and directing it through the torch to a central exit opening of the torch disposed on a longitudinal axis of the torch for exhaustion from the torch onto a workpiece in the form of ionized plasma;
    a secondary gas flow path in the torch for receiving a secondary gas separate from the primary working gas and directing it through the torch;
    a first set of secondary exit openings in the torch separate from the central exit opening and spaced a first radial distance from the longitudinal axis of the torch, said first set of secondary exit openings being in fluid communication with the secondary gas flow path for exhausting secondary gas from the torch, the first set of secondary exit openings further being oriented for directing secondary gas exhausted from the torch through the first set of secondary exit openings generally toward the workpiece; and
    a second set of secondary exit openings in the torch spaced a second radial distance from the longitudinal axis of the torch greater than said first radial distance of the first set of secondary openings, said second set of secondary exit openings being in fluid communication with the secondary gas flow path for further exhausting secondary gas from the torch, the second set of secondary exit openings further being oriented for directing secondary gas exhausted from the torch through the second set of secondary exit openings generally toward the workpiece;

the secondary gas flow path, the first set of secondary exit openings and the second set of secondary openings being adapted for directing secondary gas exhausted from the torch generally toward the workpiece at a flow rate sufficient to displace water surrounding the ionized plasma exiting the central exit opening of the torch to inhibit quenching of the ionized plasma.

36. A method of cutting a workpiece under water using a plasma torch of the type having a primary gas flow path for receiving a primary working gas and directing it through the torch to a central exit opening of the torch disposed on a longitudinal axis of the torch for exhaustion from the torch onto a workpiece in the form of ionized plasma, and a secondary gas flow path in the torch for receiving a secondary gas separate from the primary working gas and directing it through the torch, the method comprising the steps of:

operating the plasma torch under water in close proximity to the workpiece;

the step of operating the plasma torch including the steps of directing working gas along the primary gas flow path to the central exit opening of the torch for exhaustion from the torch onto the workpiece in the form of ionized plasma, directing secondary gas through the torch to a first set of secondary exit openings of the torch spaced radially outward from the central exit opening and being in fluid communication with the secondary gas flow path and to a second set of secondary exit openings of the torch spaced radially outward from the first set of secondary exit openings and being in fluid communication with the secondary gas flow path, and exhausting secondary gas from the torch through the first and second sets of secondary exit openings at a flow rate sufficient to displace water surrounding the ionized plasma exiting the central exit opening of the torch to inhibit quenching of the ionized plasma.

\* \* \* \* \*